United States Patent Office 3,453,194
Patented July 1, 1969

3,453,194
ANTICOAGULANT SURFACES PRODUCED BY RADIATION GRAFTING HEPARIN TO A SILICONE SUBSTRATE
Donald R. Bennett, Forrest O. Stark, and George E. Vogel, Midland, Mich., assignors to Dow Corning Corporation, Midland, Mich., a corporation of Michigan
No Drawing. Continuation-in-part of application Ser. No. 541,533, Apr. 11, 1966. This application Aug. 3, 1966, Ser. No. 569,834
Int. Cl. B01j 1/10
U.S. Cl. 204—159.12       10 Claims This application is a continuation-in-part of applicants' co-pending application Ser. No. 541,533, filed Apr. 11, 1966. This invention relates to materials whose surfaces have been contacted with heparin and more particularly to silicone articles whose surfaces have been contacted with heparin whereby the heparinized surface is subjected to ionizing radiation at a controlled rate whereby the heparin is effectively grafted to said surface resulting in an article which does not predispose to clot formation when in contact with blood.

Heparin is a mucopolysaccharide that occurs in the human system and it prevents the formation or characteristic clotting of blood. In many applications, particularly in the medical field and the like, heparin is frequently employed to treat various materials which come in contact with blood to achieve a desired anticoagulative effect. For example, Gott et al., Heparin bonding on Colloidal Graphite Surfaces, Science, Dec. 6, 1963, vol. 142, No. 3597, pp. 1297–1298 teaches that one can enhance anticoagulation by first coating the surface of an appropriate article with colloidal graphite, then applying a surface-active agent which lowers interfacial tension, followed by a layer of heparin. Absent the pretreatment coatings prior to application of the heparin, the heparin fails to remain on the surface of the article and resulting coagulation readily occurs. A further significant disadvantage of the technique espoused by Gott et al. is that it is totally unsuccessful on surfaces composed of silicone.

The use of silicones in the medical profession has achieved remarkable prominence in recent years. This remarkable prominence is attributed chiefly to the fact that silicone is inert to human tissue and thus, silicone materials are in constant demand for use as implants and other similar medical devices.

However, due to the fact that blood tends to coagulate rapidly when in contact with silicone surfaces, the use of such materials has been severely restricted in the past. Since the Gott technique has proven ineffective in this respect, the important problem of coagulation on silicone surfaces still exists.

It is an object of this invention to solve the problem of coagulating silicone surfaces by providing silicone articles that can be successfully treated so that they do not predispose to clot formation when in contact with blood.

It is also an object of this invention to introduce silicone articles that have been contacted with a layer of heparin and exposed to ionizing radiation whereby the heparin is grafted to the surface of the article to achieve the desired anticoagulative effect.

It is a further object of the present invention to provide silicone articles so treated without the necessity of a multistep pretreatment as was heretofore the case.

It is still a further object of this invention to provide silicone articles treated with heparin whereby the article can be cured and the heparin grafted thereto simultaneously by the use of ionizing radiation.

These and other objects will become readily apparent from the detailed description which follows.

This invention relates to a silicone substrate having heparin grafted to its surface.

This invention also relates to a method of rendering silicone surfaces anticoagulative to blood which comprises subjecting the silicone to ionizing radiation and contacting the silicone substrate with heparin whereby the heparin is grafted to the surface of said substrate.

By the term "silicone" as employed herein is simply meant any organopolysiloxane material well known in the art. Hence, by the use of the term "silicone" in this invention, it is meant to include silicone resins, silicone rubbers, and the like. Since the art is replete with references relating to the compositions and methods of manufacturing such materials, further enumeration of the silicones employed herein is deemed unnecessary.

For purposes of this invention, it is of importance to note that to achieve the desired anticoagulative effect, it is essential that the silicones of this invention possess pendan aliphatic or cycloaliphatic groups since it has been found that the grafting of heparin to the surface of the silicone is apparently accomplished by the introduction of free radicals induced by exposure to ionizing radiation.

Any effective source of ionizing radiation is perfectly suitable. Thus, one can employ a high energy electron accelerator of the Van de Graaff type. A commercially available model has a 2,000,000 electron volt (2 mev.) capacity; smaller competing electron accelerators now on the market have about 100,000 electron volt capacity. Other suitable sources of ionizing radiation for the purposes of the present invention include X-rays or gamma-irradiation, e.g., from $Co^{60}$.

The amount of radiation required can vary widely depending upon the particular substrate used. The only critical quantity is that amount sufficient to cause grafting of the heparin to the silicone. For example, one megarad shows good results under some conditions. Conversely, it has been found that the heparin-coated silicone substrate can withstand up to 10 megarads before any deleterious effects are noted. The term "megarad" as employed herein, refers to a dose of ionizing radiation which produces an energy absorption of $100 \times 10^6$ ergs per gram of irradiated substance. The term "megarad" has now replaced the term "megarep" which latter term represents the quantity of ionizing radiation which produces energy absorption of $83 \times 10^6$ ergs per gram of tissue; thus, 1 megarep=.83 megarad, or 1 megarad=1.2 megareps (approximately).

The silicone surface can be contacted with heparin before or after subjecting the silicone to ionizing radiation. In the latter case, the heparin should be brought in contact with the irradiated silicone before the free radicals on the surface of the latter have been dissipated.

By the term "contacted" as employed herein it is meant that the heparin can be mixed, milled, reacted or applied to the silicone substrate by any manner or means most suitable at the time as long as the substrate contains a sufficient amount of heparin on its surface.

One method of obtaining the desired anticoagulative effect described herein is to first apply a layer of heparin to the surface of the silicone substrate and then subject the substrate to a suitable source of ionizing radiation. The heparin can be applied to the surface of the silicone substrate in any feasible manner. Hence, the heparin can be dusted on, brushed on, or applied in any other manner that is consistent with the article to be coated. The heparin can also be employed in any form such as a powder, paste, or a dispersion; however, for best practical results it was found that the objects of this invention were achieved most readily by dusting the heparin on the surface; therefore, the heparin is best employed in powdered form. The amount of heparin applied to the surface of the substrate is not critical with the exception that it be present in sufficient quantities to impart the desired effect. Thus, the powdered heparin is dusted upon the entire surface of the silicone substrate and the article or substrate exposed to the necessary radiation, the excess heparin being washed away. Although not essential, it is preferred that the substrate be in its uncured or partially cured form prior to dusting with heparin and subsequent ionizing radiation. By using silicone substrates in their uncured or partially cured state, there is provided a tacky surface upon which the heparin can make effective contact and remain during the ionizing operation. Thus, depending upon various factors one may cure the substrate to any stage before applying the heparin. Of course, as hereinbefore related, it can also be uncured or completely cured.

Thus, it is to be further noted that the silicone substrate can be partially cured, dusted with heparin, packaged, and then subjected to radiation whereby the article has affixed thereto the necessary heparin while simultaneously being cured and sterilized. The advantages obtainable from such an operation are obviously economical, efficient, practical, and extramely attractive to those involved in the medical area.

Another method for contacting the operable ingredients which is particularly effective constitutes milling a mixture of the silicone material and heparin together and thereafter curing the combination whereby the ultimate material is not predisposed to clot formation when in contact with blood.

Articles that can be so treated for anticoagulant purposes include heart valve prosthesis, medical elastomers that are encapsulants for implanted electronic devices, elastomers for encapsulation of aneurysms, denture soft liners, denture base material, sponge subdermal implant material, mammary prosthesis, testicular prosthesis, atoplasty prosthesis, rhinoplasty implants, scleral buckler designed for use with the Everett technique, reinforced and nonreinforced sheeting, silicone rubbers used to remedy defects following facial trauma, pads for limb prosthesis, rubbers for reconstruction of fractures, coronary arteries, Eustacian tube, medical grade tubing for perfusion and other blood handling procedures such as perfusion system blood lines and other pump circuitry, coiled capillary tubing membrane oxygenators for complete cardio-pulmonary bypass; also arterial venous shunts, abdominal drains, suction drainage of orthopaedic wounds, catheters for intravenous administration of fluids for withdrawal of serial blood samples, for percutaneous flow-guided cardiac catheterization, continuous monitoring of blood glucose, intestinal decompression tubes, and for blood transfusions; also for various catheters and thoracic drains, among others.

A particularly suitable application of the present invention concerns the use of artificial hearts and the like. Since there is a continuous contact of blood on the surfaces of components of the artificial heart, silicone components treated in accordance with this invention would be of extreme value.

The following examples are illustrative only and are not intended to limit the invention which is properly delineated in the claims.

EXAMPLE 1

Glass test tubes were treated with a solution of dimethylpolysiloxane gum in pentane by filling the tubes and allowing the excess to drain out by inverting the test tube. Following evaporation of the solvent, powdered heparin was deposited into the test tube and shaken vigorously so that the internal surface of the test tube was coated with heparin. The excess heparin was shaken from the test tubes and the test tubes were then placed in a source of Cobalt 60 for a total radiation of 3 megarads. The non-grafted heparin was removed by washing the tubes with distilled water and saline solution.

The test tubes were then tested for anticoagulant properties with freshly drawn whole blood from the lower vena cava of a rabbit. A test tube, coated as above was rinsed ten times in saline solution, and 1 ml. of the freshly drawn whole blood was added and the test tube was tipped at intervals of 15 seconds for a period of 26 minutes. No clotting was observed. The test tube was then tipped periodically for the next five hours with no evidence of clot formation. A control sample without the layer of heparin was tested in an identical manner and clotting occurred within 5.25 minutes.

EXAMPLE 2

30 grams of a commercially available rubber stock and 3.0 grams of heparin were milled in a two-roll mill until an efficient mixture was obtained. A toluene dispersion of the above mixture was made and the internal surface of test tubes were coated with the dispersion and were allowed to remain standing until the toluene eventually evaporated. The test tubes were then placed in a source of Cobalt 60 for a total of 3 megarads whereby the coating was cured and the heparin grafted.

The test tubes were then tested for anticoagulative effects following the procedure outlined in Example 1. No clotting was observed in the above test tubes whereas control test tubes clotted within 5 minutes.

EXAMPLE 3

A test tube, treated as in Example 1 (dimethylpolysiloxane gum+heparin+radiation) was rinsed 100 times with saline solution, soaked in saline solution overnight, and rinsed an additional ten times just prior to testing. To the test tube was added 0.9 ml. of citrated human whole blood, 0.1 ml. 0.1 mol. $CaCl_2$ and the tube was then tipped in a water bath at a temperature of 38° C. at intervals of 15 seconds for a period of 10 minutes followed by occasional tipping to determine clot time over a period of 3 hours. The following results were obtained:

| Sample: | Surface treatment | Clot time |
|---|---|---|
| 1 | Dimethylpolysiloxane gum plus heparin | No clot for three hours. |
| 2 | Glass, no heparin treatment | Clots in 2.25 minutes. |
| 3 | Silicone rubber, no heparin treatment | Clots in 2.75 minutes. |

EXAMPLE 4

To demonstrate that the radiation process is necessary to effectively graft the heparin to the silicone substrate, test tubes were prepared and treated as in Example 1 and were exposed to various degrees of radiation while identical test tubes were tested for contact without radiation. The test tubes were treated for anticoagulant properties after soaking overnight in saline solution using 1 ml. citrated human whole blood, 0.1 ml. 0.1 mol. $CaCl_2$. The test tubes were then tipped at intervals of 30 seconds for a period of 10 minutes and occasionally thereafter until clot formation. The following results were obtained:

| Sample: | Surface treatment | Radiation[1] | Clot time |
|---|---|---|---|
| 1 | Dimethylpolysiloxane/heparin | 1 megarad | No clot for 24 hours. |
| 2 | do | No radiation rinsed after 5 min. contact | Clot in 3 mins. |
| 3 | do | No radiation rinsed after 30 min. contact | Clot in 2.5 mins. |
| 4 | do | 1 megarad of radiation 30 min. after contact | No clot for 72 hours. |

[1] In the above test, where no radiation was employed, the heparin was not grafted to the silicone surface, and clotting occurred rapidly.

EXAMPLE 5

A silicone rubber ring, 9 mm. long with an external diameter of about 10 mm., treated as in Example 1, was inserted into the superior vena cava of a dog (an area where the surface of the ring would be subjected to a heavy and continuous flow of blood) and no clotting of blood was observed.

EXAMPLE 6

30 grams of a commercially available rubber stock and 3.0 grams of heparin were milled together on a two-roll mill until an efficient mixture was obtained. Rings, 9 mm. long with an external diameter of about 10 mm., were then molded from the above mixture and subjected to ionizing radiation whereby the rings were cured and the heparin grafted. The rings were then inserted into the superior vena cava of dogs. After a substantial period of time, the rings were removed and no clotting of blood was observed.

EXAMPLE 7

When the test tubes treated as in Example 1 were subjected to 4, 5, 6, 7, 8, 9, and 10 megarads of radiation and then tested in accordance with the procedures of Example 1, equivalent results were obtained.

That which is claimed is:

1. The method of rendering silicone surfaces anticoagulative to blood which comprises exposing the silicone surface to high energy ionizing radiation and contacting the silicone surface with heparin, whereby the heparin is grafted to the silicone.

2. The method in accordance with claim 1 comprising the steps:
   (1) contacting the surface with heparin, and
   (2) thereafter exposing said surface to the high energy ionizing radiation whereby the heparin is grafted to said surface.

3. The method as recited in claim 1 wherein the ionizing radiation is within a range of from 1 to 10 megarads.

4. The method as recited in claim 2 wherein the heparin is powdered.

5. The method as recited in claim 2 wherein the surface is a silicone rubber.

6. The method as recited in claim 2 wherein the surface is a silicone resin.

7. The method as recited in claim 2 wherein the surface comprises at least a portion of an article intended for medical implantation.

8. An article intended for medical implantation, at least a portion of the surface of said article being composed of silicone having radiation grafted thereto heparin whereby the silicone portion of said surface is rendered anticoagulative to blood, said article produced by the method of claim 2.

9. An article as recited in claim 8 which is a heart valve.

10. A silicone substrate having heparin radiation grafted to its surface produced by the method of claim 1.

No references cited.

MURRAY TILLMAN, *Primary Examiner.*

R. B. TURER, *Assistant Examiner.*

U.S. Cl. X.R.

3—1. 36; 117—93.3; 128—33; 167—65, 74, 84.5; 204—159.13